(12) United States Patent
Maeda

(10) Patent No.: US 7,806,671 B2
(45) Date of Patent: Oct. 5, 2010

(54) PISTON PUMP

(75) Inventor: Junichi Maeda, Chiryu (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1183 days.

(21) Appl. No.: 10/928,116

(22) Filed: Aug. 30, 2004

(65) Prior Publication Data

US 2005/0063846 A1   Mar. 24, 2005

(30) Foreign Application Priority Data

Sep. 18, 2003   (JP) .............................. 2003-326610

(51) Int. Cl.
*F04B 37/00* (2006.01)
*F04B 19/00* (2006.01)

(52) U.S. Cl. .................................................... 417/471

(58) Field of Classification Search ................ 417/471, 417/545, 549, 470, 552, 554, 570, 571, 56, 417/569; 92/181 R, 185; 91/172; 251/62, 251/63, 324

See application file for complete search history.

(56) References Cited

U.S. PATENT DOCUMENTS

| | | | | |
|---|---|---|---|---|
| 1,936,526 A | * | 11/1933 | Seidel | 222/173 |
| 2,623,501 A | * | 12/1952 | Audemar | 92/162 R |
| 3,511,137 A | * | 5/1970 | Smith | 92/171.1 |
| 4,398,450 A | * | 8/1983 | Louhio | 91/477 |
| 4,469,069 A | * | 9/1984 | Kuroyanagi et al. | 123/447 |
| 4,541,789 A | * | 9/1985 | Nothdurft | 417/498 |
| 4,635,605 A | * | 1/1987 | Faupel et al. | 123/449 |
| 4,662,336 A | * | 5/1987 | Hofer et al. | 123/449 |
| 5,577,896 A | * | 11/1996 | Harada | 417/259 |
| 5,816,134 A | * | 10/1998 | Takenaka et al. | 92/154 |

6,079,961 A   6/2000   Schuller et al.

(Continued)

FOREIGN PATENT DOCUMENTS

DE   3729077 A1 *   3/1989

(Continued)

OTHER PUBLICATIONS

Machine Translation of DE 19709586A1.*

(Continued)

*Primary Examiner*—Devon C Kramer
*Assistant Examiner*—Amene S Bayou
(74) *Attorney, Agent, or Firm*—Buchanan Ingersoll & Rooney PC

(57) ABSTRACT

A piston pump includes a piston for increasing and decreasing the volume of a pump chamber formed in a cylinder bore of a cylinder member, by axially reciprocating movement thereof; a suction valve provided in the piston, and opening and closing when the volume of the pump chamber increases and decreases, respectively; and a discharge valve provided at a discharge side of the pump chamber, and opening and closing when the volume of the pump chamber decreases and increases, respectively. A plurality of mutually communicating, axially extending grooves are formed on an outer circumferential portion of the piston located on the pump-chamber side. A cylindrical seat member is fixedly and externally fitted to the piston in a region of the communicating grooves. A valve port and a valve seat of the suction valve are formed at an end portion of the seat member located on the pump-chamber side.

8 Claims, 4 Drawing Sheets

U.S. PATENT DOCUMENTS

| | | | |
|---|---|---|---|
| 6,161,466 A | 12/2000 | Schuller et al. | |
| 6,224,352 B1 | 5/2001 | Hauser et al. | |
| 6,250,206 B1 * | 6/2001 | Johnson | 92/158 |
| 6,276,909 B1 * | 8/2001 | Siegel et al. | 417/549 |
| 6,341,950 B1 * | 1/2002 | Schuller et al. | 417/554 |
| 6,471,496 B1 * | 10/2002 | Merklein et al. | 417/569 |

FOREIGN PATENT DOCUMENTS

| | | |
|---|---|---|
| DE | 197 09 586 A1 | 9/1998 |
| EP | 0 631 050 A1 | 12/1994 |
| JP | 2001-501273 | 1/2001 |
| JP | 2001-501276 | 1/2001 |
| JP | 3278982 | 2/2002 |
| WO | WO 99/06698 A1 | 2/1999 |

OTHER PUBLICATIONS

German Office Action with English translation dated Jun. 20, 2007.

* cited by examiner

PISTON PUMP

BACKGROUND OF THE INVENTION

1. Field of the Invention

The present invention relates to a piston pump for use in, for example, a vehicular brake apparatus.

2. Description of the Related Art

Piston pumps of such a type are disclosed in, for example, Japanese kohyo (PCT) Patent Publication No. 2001-501273 and Japanese Patent No. 3278982. Each of the disclosed piston pumps includes a pump housing having a cylinder bore formed therein; a piston which defines a pump chamber within the cylinder bore and is axially reciprocated so as to increase and decrease the volume of the pump chamber; a suction valve provided in the piston, opening when the volume of the pump chamber increases, and closing when the volume decreases; and a discharge valve provided at the discharge side of the pump chamber, opening when the volume of the pump chamber decreases, and closing when the volume increases. The piston is axially reciprocated to thereby increase and decrease the volume of the pump chamber, whereby fluid flows from a suction port to a discharge port.

In the above-mentioned conventional piston pumps, a portion of a flow path connecting the suction port and the suction valve is formed in the piston by means of cutting, resulting in an increase in the cost of manufacturing the piston. Furthermore, a portion of the flow path formed in the piston is composed of radially extending, communicating holes and an axially extending, communicating hole; and burrs may arise at the intersections between the radially extending, communicating holes and the corresponding axially extending, communicating hole. If a process of removing the burrs is required, the cost of manufacturing the piston will increase further. Since a portion of the flow path connecting the suction port and the suction valve is formed in the piston, the flow path may fail to be imparted with a sufficiently large size, potentially resulting in an increase in flow resistance of the flow path.

SUMMARY OF THE INVENTION

In view of the foregoing, an object of the present invention is to provide a piston pump which can be manufactured at low cost and allows a drop in flow resistance of a flow path connecting a suction port and a suction valve.

To achieve the above object, the present invention provides a piston pump comprising a pump housing having a cylinder bore, a suction port, and a discharge port; a piston defining a pump chamber within the cylinder bore, the piston being axially reciprocated so as to increase and decrease a volume of the pump chamber; a suction valve provided in the piston, opening when the volume of the pump chamber increases, and closing when the volume decreases; and a discharge valve provided at a discharge side of the pump chamber, opening when the volume of the pump chamber decreases, and closing when the volume increases. The piston is axially reciprocated so as to increase and decrease the volume of the pump chamber to thereby cause fluid to flow from the suction port to the discharge port. A plurality of communicating grooves are formed on an outer circumferential portion of the piston located on a side toward the pump chamber, in such a manner as to extend axially and to communicate with one another at their end portions located on the side toward the pump chamber. A cylindrical seat member is externally fitted in a fixed condition to the piston in a region corresponding to end portions of the communicating grooves located on the side toward the pump chamber. A valve port and a valve seat of the suction valve are formed at an end portion of the seat member located on the side toward the pump chamber.

In the piston pump, a portion of the flow path connecting the suction port and the suction valve is defined by the plurality of communicating grooves formed on the outer surface of the piston, and the cylindrical seat member externally and fixedly fitted to the piston in a region corresponding to the communicating grooves. This feature allows the piston to be manufactured without involvement of cutting (the piston can be, for example, a forged part, a press-shaped part, or a resin-molded part), thereby reducing the cost of manufacturing the piston. In the piston pump, since a portion of the flow path connecting the suction port and the suction valve is defined by the communicating grooves and the seat member, the size of the flow path is unlikely to be limited. Thus, the flow resistance of the flow path connecting the suction port and the suction valve can be lowered, whereby pump performance can be enhanced.

The piston pump of the present invention may be configured in such a manner that an annular flange portion extending radially outward is formed on the seat member; and the flange portion holds an annular seal member interposed between the cylinder bore and the seat member and adapted to seal against the cylinder bore and the seat member. In this case, the seat member can also function as a seal-holding member, whereby the piston pump can assume a simple, inexpensive configuration.

The piston pump of the present invention may be configured in such a manner that the seat member is a resin-molded part; an annular mounting groove is formed on an outer circumferential portion of the seat member; and the annular seal member interposed between the cylinder bore and the seat member and adapted to seal against the cylinder bore and the seat member is fitted into the mounting groove. In this case, the valve port, the valve seat, the annular mounting groove, and the like to be formed on the seat member can be formed when the seat member is formed by means of molding, so that the cost of producing the seat member can be reduced.

The piston pump of the present invention may be configured in such a manner that a guide portion for guiding axial movement of the piston along the cylinder bore is integrally formed on the seat member. In this case, the guide portion of the seat member can guide the axial movement of the piston, so that smooth axial movement of the piston can be ensured.

The piston pump of the present invention may be configured in such a manner that an annular mounting groove is formed on the seat member, a slide ring being fitted into the annular mounting groove in such a manner as to be movable along the axial direction of the piston, the slide ring being axially movable in relation to the piston while synchronizing with increase and decrease in the volume of the pump chamber, and the slide ring serving as a partition between a suction chamber and a discharge chamber provided around an outer circumference of the piston; communication holes are formed in the seat member in order to establish communication between the corresponding communicating grooves and the annular mounting groove; when the volume of the pump chamber increases, the slide ring shuts off communication between the suction chamber and the discharge chamber, fluid is charged into the pump chamber from the discharge chamber via the suction valve, and fluid is charged into the suction chamber through the suction port; and when the volume of the pump chamber decreases, the slide ring establishes communication between the suction chamber and the discharge chamber, and fluid is charged into the discharge chamber from the suction chamber. In this case, the piston pump can be a self-priming piston pump of a type disclosed in Japanese Patent No. 3278982 and can be suited for handling fluid of high kinematic viscosity.

In this case, the seat member may comprise a press-shaped part of metal having the valve port and the valve seat, and a resin-molded part connected to the press-shaped part and having the communication holes and the annular mounting groove for the slide ring.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
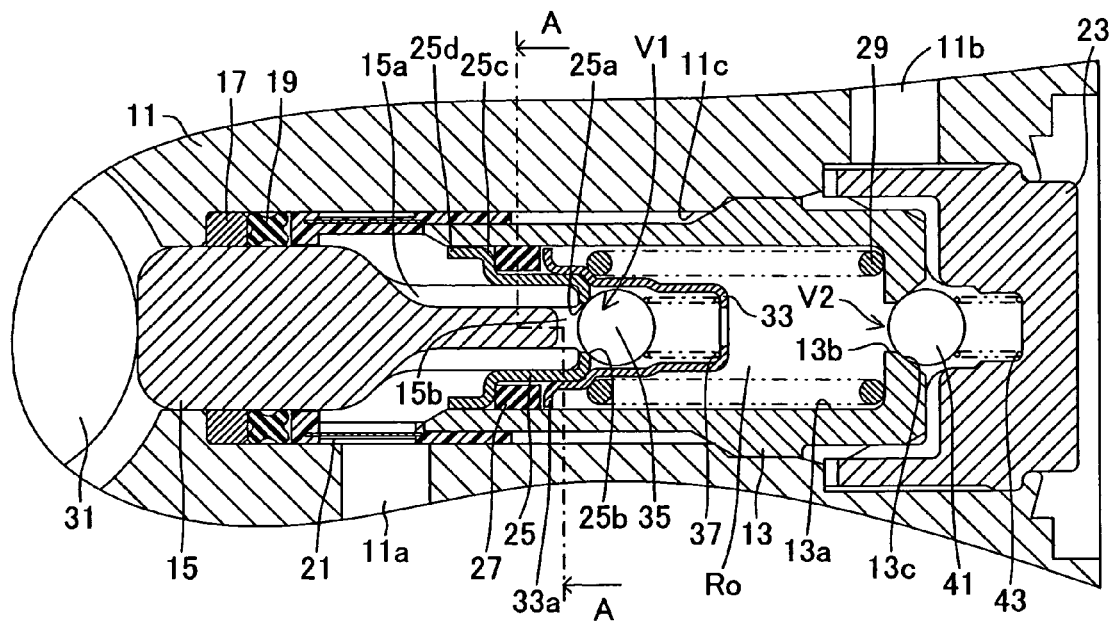
FIG. 1 is a sectional view showing the overall configuration of a first embodiment of a piston pump according to the present invention.
Figure 2:
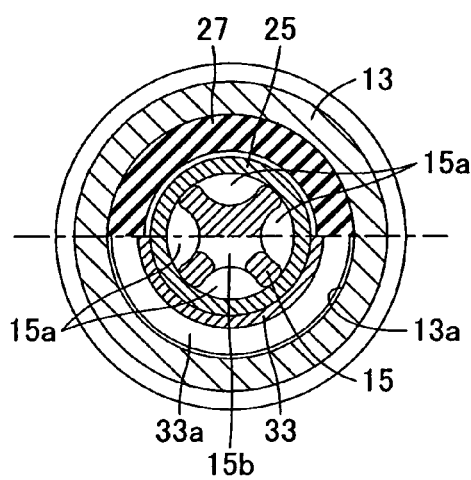
FIG. 2 is an enlarged sectional view taken along line A-A of FIG. 1.

Embodiments of the present invention will next be described in detail with reference to the drawings. FIGS. 1 and 2 show a first embodiment of a piston pump according to the present invention. In the piston pump of the first embodiment, a pump housing 11 has a suction port 11a and a discharge port 11b. A cylinder member 13, a piston 15, a suction valve V1, and a discharge valve V2 are built into an internal cavity 11c of the pump housing 11.

The cylinder member 13 has a cylinder bore 13a, and a valve port 13b and a valve seat 13c of the discharge valve V2. The cylinder member 13, the piston 15, a guide ring 17, a seal ring 19, and a filter 21 are built into the internal cavity 11c of the pump housing 11. A cap 23 prevents the components built into the internal cavity 11c from coming out. A small-diameter end portion of the piston 15, a seat member 25, a seal member 27, and the suction valve V1 are built into the cylinder bore 13a of the cylinder member 13; and a piston return spring 29 is also built into the cylinder bore 13a.

A large-diameter end portion of the piston 15 is fitted into the internal cavity 11c of the pump housing 11 via the guide ring 17 and the seal ring 19 in a fluid-tight, axially slidable condition. The large-diameter end of the piston 15 is slidably engaged with the outer circumferential surface of an eccentric member 31, which is rotatably driven by means of an electric motor (not shown). The small-diameter end portion of the piston 15, and the seat member 25 and the seal member 27 attached to the small-diameter end portion partially define a pump chamber Ro in the cylinder bore 13a. As the eccentric member 31 is rotated, the piston 15 is axially reciprocated and causes the volume of the pump chamber Ro to change. Specifically, when the piston 15 is axially advanced against a biasing force of the piston return spring 29, the volume of the pump chamber Ro decreases. When the piston 15 is axially retracted by means of the biasing force of the piston return spring 29, the volume of the pump chamber Ro increases.

Four axially extending communicating grooves 15a are formed on the outer circumferential surface of the small-diameter portion of the piston 15, the small-diameter portion being located on the side toward the pump chamber Ro. A recess 15b is formed coaxially on the small-diameter end of the piston 15. The recess 15b opens toward a valve port 25a of the suction valve V1, thereby establishing communication among the four communicating grooves 15a at their end portions located on the side toward the pump chamber Ro.

The seat member 25 is a press-shaped part of metal and assumes a cylindrical shape. The seat member 25 is externally fitted in a fixed condition to the small-diameter end portion of the piston 15, the small-diameter end portion being located on the side toward the pump chamber Ro. Thus, the seat member 25 can be axially movable together with the piston 15 in a unitary condition. The valve port 25a and a valve seat 25b of the suction valve V1 are formed at an end portion of the seat member 25 located on the side toward the pump chamber Ro. At the other end portion of the seat member 25, an annular flange portion 25c is integrally formed and extends radially outward so as to hold the seal member 27. At the outer circumference of the flange portion 25c, a cylindrical guide portion 25d is integrally formed and extends axially. The cylindrical guide portion 25d guides the axial movement of the piston 15 in relation to the cylinder bore 13a.

The seal member 27 is an annular seal member and is interposed between the cylinder member 13 and the seat member 25 so as to seal against the members. When the piston 15 is axially advanced against the biasing force of the piston return spring 29, the seal member 27 is pressed by the flange portion 25c of the seat member 25 and moves axially. When the piston 15 is axially retracted by means of the biasing force of the piston return spring 29, the seal member 27 is pressed by an annular flange portion 33a of a spring retainer 33 of the suction valve V1 and moves axially.

The piston return spring 29 is a compression coil spring and is interposed between the cylinder member 13 and the spring retainer 33 of the suction valve V1 while a preload is imposed thereon. The piston return spring 29 biases the piston 15, the seat member 25, the seal member 27, and the suction valve V1, among others, toward the eccentric member 31.

The suction valve V1 is provided on an end portion of the piston 15 located on the side toward the pump chamber Ro. The suction valve V1 includes a ball valve body 35, which is seated on or departs from the valve seat 25b formed on the seat member 25; and a spring 37 interposed between the ball valve body 35 and the spring retainer 33 and biasing the ball valve body 35 toward the valve seat 25b by means of imposing a small load on the ball valve body 35. The suction valve V1 opens when the volume of the pump chamber Ro increases, and closes when the volume decreases.

The discharge valve V2 is provided at a discharge end portion of the cylinder member 13, the discharge end portion corresponding to the discharge side of the pump chamber Ro. The discharge valve V2 includes a ball valve body 41, which is seated on or departs from the valve seat 13c formed on the cylinder member 13; and a spring 43 interposed between the ball valve body 41 and the cap 23 and biasing the ball valve body 41 toward the valve seat 13*c* by means of imposing a small load on the ball valve body 41. The discharge valve V2 closes when the volume of the pump chamber Ro increases, and opens when the volume decreases.

In the thus-configured piston pump of the first embodiment, when an electric motor (not shown) rotates the eccentric member 31, the eccentric member 31 and the piston return spring 29 cooperatively function to axially reciprocate the piston 15, thereby alternately increasing and decreasing the volume of the pump chamber Ro. The suction valve V1 and the discharge valve V2 function accordingly, whereby fluid flows from the suction port 11*a* to the discharge port 11*b*.

In the piston pump of the first embodiment, a portion of the flow path connecting the suction port 11*a* and the suction valve V1 is defined by the plurality of communicating grooves 15*a* formed on the outer circumferential surface of the piston 15, and the cylindrical seat member 25 externally and fixedly fitted to the piston 15 in a region corresponding to the communicating grooves 15*a*. This feature allows the piston 15 to be manufactured without involvement of cuffing (the piston 15 can be, for example, a forged part, a press-shaped part, or a resin-molded part), thereby reducing the cost of manufacturing the piston 15. In the piston pump, since a portion of the flow path connecting the suction port 11*a* and the suction valve V1 is defined by the communicating grooves 15*a* and the seat member 25, the size of the flow path is unlikely to be limited. Thus, the flow resistance of the flow path connecting the suction port 11*a* and the suction valve V1 can be lowered, whereby pump performance can be enhanced.

In the piston pump of the first embodiment, the seat member 25 has the annular flange portion 25*c* extending radially outward, and the flange portion 25*c* holds the annular seal member 27 interposed between the cylinder member 13 and the seat member 25 and adapted to seal against the members. Thus, the seat member 25 can also function as a seal-holding member, so that the piston pump can be configured simply and thus can be manufactured at low cost.

In the piston pump of the first embodiment, the seat member 25 has the integrally formed guide portion 25*d* adapted to guide the axial movement of the piston 15 along the cylinder bore 13*a*. The guide portion 25*d* of the seat member 25 can guide the axial movement of the piston 15, so that smooth axial movement of the piston 15 can be ensured.

In the above-described first embodiment, the seat member 25 is embodied as a press-shaped part of metal. However, as in the case of a second embodiment shown in FIG. 3 or a third embodiment shown in FIG. 4, the seat member 25 can be embodied as a resin-molded part. In the second embodiment shown in FIG. 3 and the third embodiment shown in FIG. 4, structural features other than the seat member 25 are identical with those of the above-described first embodiment and are thus denoted by common reference numerals, and repeated description thereof is omitted.

Figure 3:
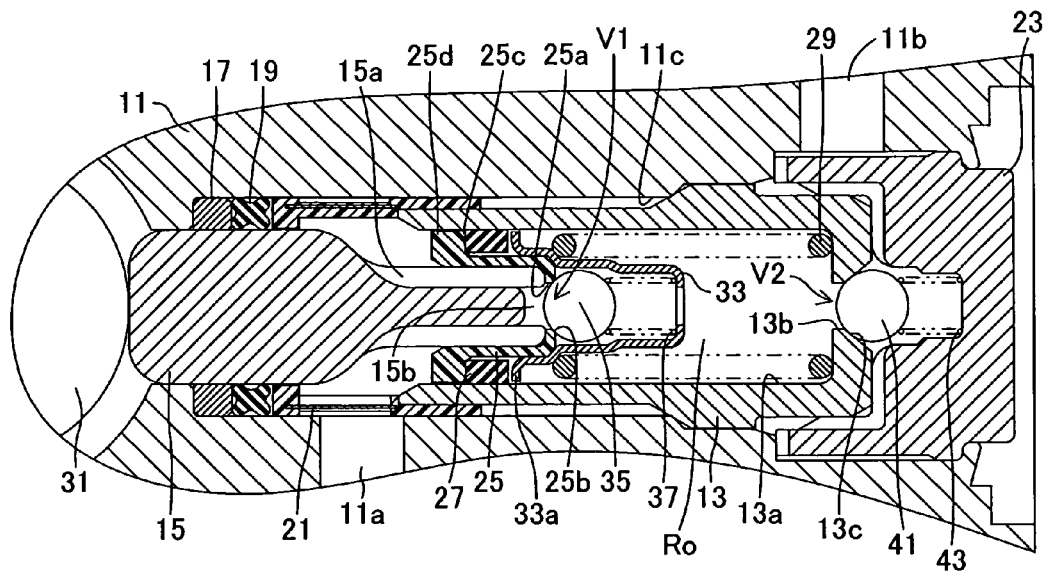
FIG. 3 is a sectional view showing the overall configuration of a second embodiment of the piston pump according to the present invention.

As in the case of the seat member 25 shown in FIG. 1, the seat member 25 of the second embodiment shown in FIG. 3 includes the valve port 25*a* and the valve seat 25*b* of the suction valve V1; the annular flange portion 25*c* extending radially outward and adapted to hold the seal member 27; and the cylindrical guide portion 25*d* extending axially from the flange portion 25*c* and adapted to guide the axial movement of the piston 15 along the cylinder bore 13*a*. Thus, the second embodiment shown in FIG. 3 can yield action and effect similar to those yielded by the first embodiment.

Figure 4:
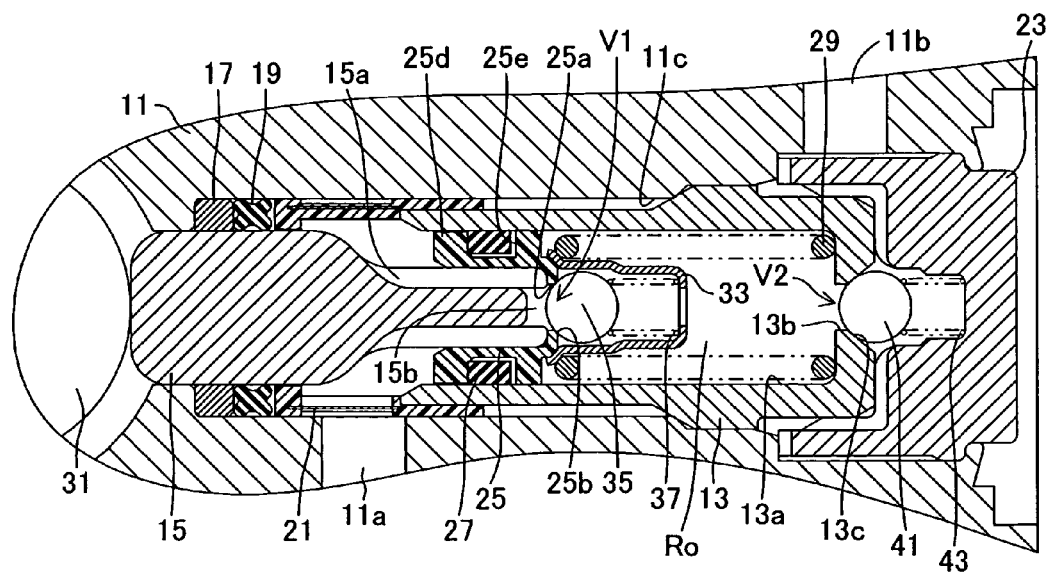
FIG. 4 is a sectional view showing the overall configuration of a third embodiment of the piston pump according to the present invention.

As in the case of the seat member 25 shown in FIG. 1, the seat member 25 of the third embodiment shown in FIG. 4 includes the valve port 25*a* and the valve seat 25*b* of the suction valve V1; and the cylindrical guide portion 25*d* extending axially and adapted to guide the axial movement of the piston 15 along the cylinder bore 13*a*. The seat member 25 shown in FIG. 4 has an annular mounting groove 25*e* formed at its outer circumferential portion. The seal member 27 is fitted into the mounting groove 25*e*. In the third embodiment, the spring retainer 33 of the suction valve V1 does not need to have the annular flange portion 33*a*.

Thus, the third embodiment shown in FIG. 4 can also yield action and effect similar to those yielded by the first embodiment. In the third embodiment, the valve port 25*a*, the valve seat 25*b*, the guide portion 25*d*, the annular mounting groove 25*e*, and the like to be formed on the seat member 25 can be formed when the seat member 25 is formed by means of molding, so that the cost of producing the seat member 25 can be reduced. Since the spring retainer 33 of the suction valve V1 does not need to have the annular flange portion 33*a*, the spring retainer 33 can assume a simple, inexpensive configuration.

The above first to third embodiments are described while mentioning an ordinary piston pump. However, the present invention can be embodied as a self-priming piston pump of a type disclosed in Japanese Patent No. 3278982. A fourth embodiment of the present invention, which is of a self-priming type, will be described below with reference to FIG. 5, and a fifth embodiment of the present invention will be described below with reference to FIG. 6.

Figure 5:
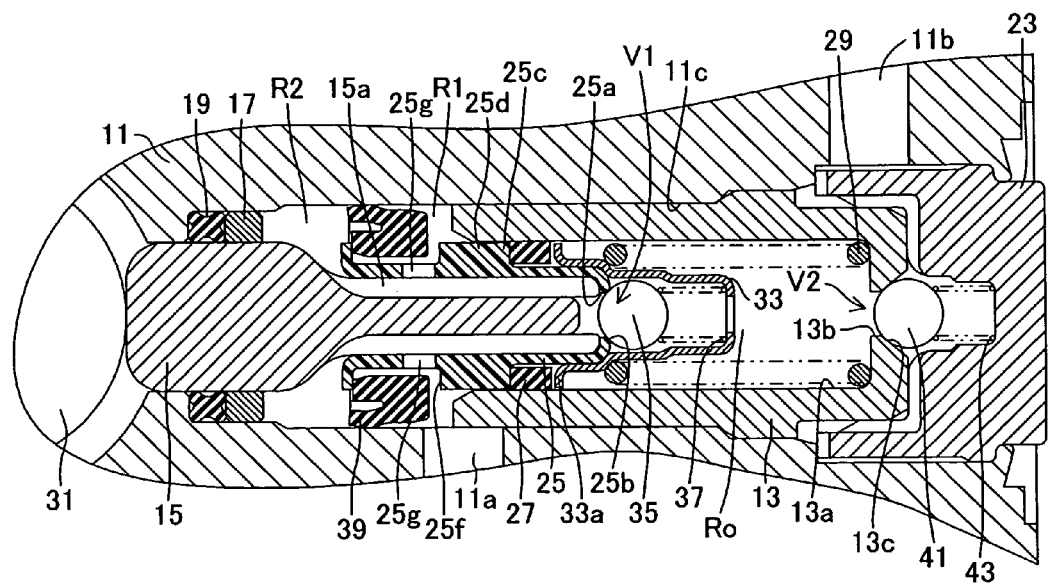
FIG. 5 is a sectional view showing the overall configuration of a fourth embodiment of the piston pump according to the present invention.

In the fourth embodiment shown in FIG. 5, the filter 21 is provided in a region other than the piston pump. An annular mounting groove 25*f* is formed on the seat member 25. A slide ring 39 is fitted into the annular mounting groove 25*f* in an axially movable condition. Radially extending communication holes 25*g* are formed in the seat member 25 in order to establish communication between a bottom portion of the annular mounting groove 25*f* and the corresponding communicating grooves 15*a*. The slide ring 39 can move along the axial direction of the piston 15 in relation to the piston 15 while synchronizing with increase and decrease in the volume of the pump chamber Ro. The slide ring 39 serves as a partition between a suction chamber R1 and a discharge chamber R2, which are provided between the pump housing 11 and the piston 15.

In the fourth embodiment, when the volume of the pump chamber Ro increases, the slide ring 39 shuts off communication between the suction chamber R1 and the discharge chamber R2; fluid is charged into the pump chamber Ro from the discharge chamber R2 via the communicating grooves 15*a* and the suction valve V1; and fluid is charged into the suction chamber R1 through the suction port 11*a*. When the volume of the pump chamber Ro decreases, the slide ring 39 establishes communication between the suction chamber R1 and the discharge chamber R2 as shown in FIG. 5; and fluid is charged into the discharge chamber R2 from the suction chamber R1. In the fourth embodiment, structural features other than the above-described structural feature are substantially identical with those of the above-described second embodiment shown in FIG. 3 and are thus denoted by common reference numerals, and repeated description thereof is omitted.

Thus, the fourth embodiment shown in FIG. 5 can also yield action and effect similar to those yielded by the second embodiment. The fourth embodiment can be a self-priming piston pump of a type disclosed in Japanese Patent No. 3278982 and can be suited for handling fluid of high kinematic viscosity.

Figure 6:
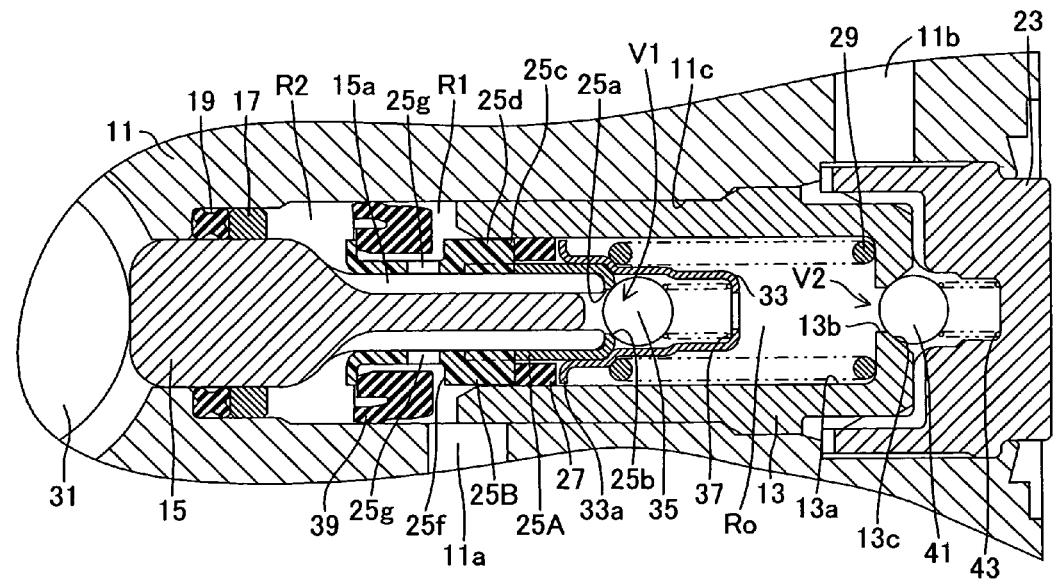
FIG. 6 is a sectional view showing the overall configuration of a fifth embodiment of the piston pump according to the present invention.

The fifth embodiment shown in FIG. 6 employs a seat member composed of a first seat member 25A and a second seat member 25B, in place of the seat member 25, which is shown in FIG. 5 and is a resin-molded part. The first seat member 25A is a press-shaped part having the valve port 25a and the valve seat 25b. The second seat member 25B is a resin-molded part connected to the first seat member 25A and having the communication holes 25g and the annular mounting groove 25f for the slide ring 39. Thus, the fifth embodiment can also yield action and effect similar to those yielded by the fourth embodiment.

Figure 7:
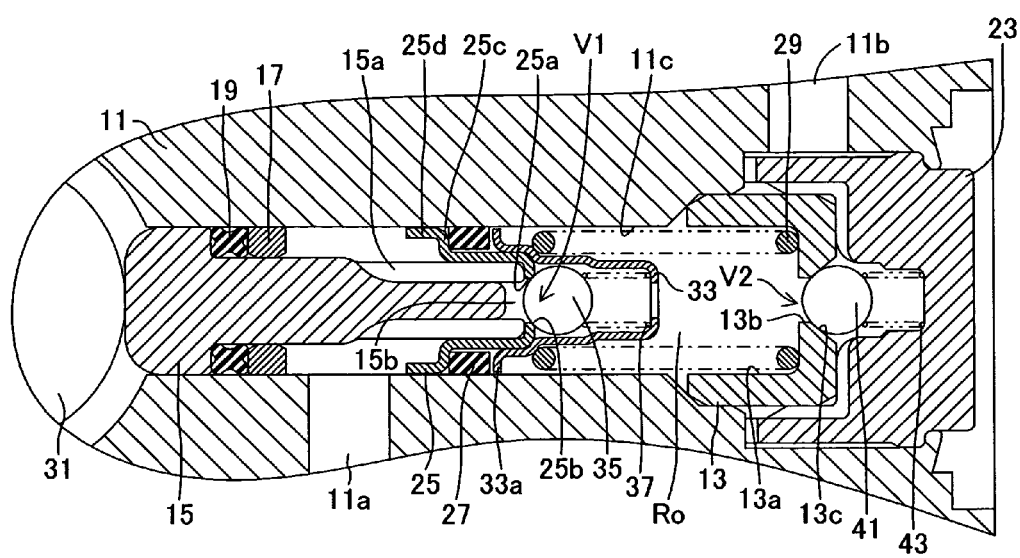
FIG. 7 is a sectional view showing the overall configuration of a sixth embodiment of the piston pump according to the present invention.

The first to fifth embodiments are described while mentioning a configuration in which the cylinder bore 13a is formed in the cylinder member 13 built into the pump housing 11. However, as in the case of a sixth embodiment of the present invention shown in FIG. 7, the internal cavity 11c of the pump housing 11 may serve as a cylinder bore. In the sixth embodiment shown in FIG. 7, structural features are substantially identical with those of the above-described first embodiment except that the filter 21 is provided in a region other than the piston pump, and are thus denoted by common reference numerals, and repeated description thereof is omitted. In the sixth embodiment, the piston 15 and the seat member 25 are configured in a manner substantially identical with that of the first embodiment; therefore, the sixth embodiment can yield action and effect similar to those yielded by the first embodiment.

Obviously, numerous modifications and variations of the present invention are possible in light of the above teachings. It is therefore to be understood that within the scope of the appended claims, the present invention may be practiced otherwise than as specifically described herein.

What is claimed is:

1. A piston pump comprising:
   a pump housing having a cylinder bore, a suction port, and a discharge port;
   a piston defining a pump chamber within the cylinder bore, the piston being axially reciprocated so as to increase and decrease a volume of the pump chamber;
   a suction valve provided at a suction side of the pump chamber, opening when the volume of the pump chamber increases, and closing when the volume decreases; and
   a discharge valve provided at a discharge side of the pump chamber, opening when the volume of the pump chamber decreases, and closing when the volume increases,
   wherein a cylindrical seat member is externally fitted in a fixed condition to an end portion of the piston located on a side of the piston toward the pump chamber;
   a valve port and a valve seat of the suction valve are formed at an end portion of the cylindrical seat member located on the side toward the pump chamber;
   a plurality of communicating grooves are formed on an outer circumferential portion of the piston located on the side of the piston toward the pump chamber, the communicating grooves extending axially; and
   a recess is formed at a center portion of an end face of the piston located on the side toward the pump chamber, the recess being coaxial with the piston and opening toward the valve port of the suction valve so that an inner circumference of the recess establishes communication among bottom portions of the communicating grooves at the end face of the piston located on the side toward the pump chamber.

2. A piston pump according to claim 1, wherein an annular flange portion extending radially outward is formed on the seat member; and the flange portion holds an annular seal member interposed between the cylinder bore and the seat member and adapted to seal against the cylinder bore and the seat member.

3. A piston pump according to claim 1, wherein the seat member is a resin-molded part; an annular mounting groove is formed on an outer circumferential portion of the seat member; and the annular seal member interposed between the cylinder bore and the seat member and adapted to seal against the cylinder bore and the seat member is fitted into the mounting groove.

4. A piston pump according to claim 1, wherein the cylinder bore is formed in a cylinder member built into an internal cavity of the pump housing.

5. A piston pump according to claim 2, wherein a guide portion for guiding axial movement of the piston along the cylinder bore is integrally formed on the seat member.

6. A piston pump according to claim 3, wherein a guide portion for guiding axial movement of the piston along the cylinder bore is integrally formed on the seat member.

7. A piston pump according to claim 1, wherein an annular mounting groove is formed on the seat member, a slide ring being fitted into the annular mounting groove in such a manner as to be movable along an axial direction of the piston, the slide ring being axially movable in relation to the piston while synchronizing with increase and decrease in the volume of the pump chamber, and the slide ring serving as a partition between a suction chamber and a discharge chamber provided around an outer circumference of the piston; communication holes are formed in the seat member in order to establish communication between the corresponding communicating grooves and the annular mounting groove; when the volume of the pump chamber increases, the slide ring shuts off communication between the suction chamber and the discharge chamber, fluid is charged into the pump chamber from the discharge chamber via the suction valve, and fluid is charged into the suction chamber through the suction port; and when the volume of the pump chamber decreases, the slide ring establishes communication between the suction chamber and the discharge chamber, and fluid is charged into the discharge chamber from the suction chamber.

8. A piston pump according to claim 7, wherein the seat member comprises a press-shaped part of metal having the valve port and the valve seat, and a resin-molded part connected to the press-shaped part and having the communication holes and the annular mounting groove for the slide ring.

* * * * *